(12) United States Patent
Korman

(10) Patent No.: US 6,916,238 B2
(45) Date of Patent: Jul. 12, 2005

(54) CANOPY AIR DELIVERY SYSTEM

(76) Inventor: David J. Korman, 3264 Dayflower, Unit C, Las Vegas, NV (US) 89121

( * ) Notice: Subject to any disclaimer, the term of this patent is extended or adjusted under 35 U.S.C. 154(b) by 0 days.

(21) Appl. No.: 10/193,487

(22) Filed: Jul. 10, 2002

(65) Prior Publication Data

US 2004/0009746 A1 Jan. 15, 2004

Related U.S. Application Data

(60) Provisional application No. 60/304,377, filed on Jul. 10, 2001.

(51) Int. Cl.$^7$ ................................................ B01L 1/04
(52) U.S. Cl. .................................... 454/187; 55/385.2
(58) Field of Search .......................... 454/187; 55/361, 55/369, 381, 374, 385.2

(56) References Cited

U.S. PATENT DOCUMENTS

| | | | |
|---|---|---|---|
| 3,505,989 A | | 4/1970 | Truhan |
| 3,721,067 A | * | 3/1973 | Agnew ........................ 95/273 |
| 3,724,172 A | | 4/1973 | Wood |
| 3,820,536 A | | 6/1974 | Anspach, Jr. et al. |
| 3,954,429 A | | 5/1976 | van der Waaij |
| 4,140,498 A | * | 2/1979 | Krause .......................... 96/81 |
| 4,872,397 A | | 10/1989 | Demeter et al. |
| 5,195,922 A | | 3/1993 | Genco |
| 5,453,049 A | | 9/1995 | Tillman, Jr. et al. |
| 5,904,896 A | * | 5/1999 | High ............................... 422/4 |
| 5,947,815 A | * | 9/1999 | Danforth ..................... 454/289 |
| 6,119,689 A | | 9/2000 | Korman |
| 6,358,139 B1 | * | 3/2002 | Renz ........................... 454/187 |
| 6,391,075 B1 | * | 5/2002 | Meiji et al. ................. 55/385.2 |
| 6,428,590 B1 | * | 8/2002 | Lehman et al. ................ 55/334 |
| 6,572,468 B1 | * | 6/2003 | Sasaki et al. ................ 454/187 |

\* cited by examiner

*Primary Examiner*—Gregory Wilson
(74) *Attorney, Agent, or Firm*—Mallinckrodt & Mallinckrodt; Robert R. Mallinckrodt

(57) ABSTRACT

An area air delivery system for delivery of filtered air to an area occupiable by a user who can enter and leave the area, such as the head end of a bed, includes a canopy for at least partially surrounding the area to which air is to be supplied and defining the area which a user can enter and leave. An air diffuser positioned in the canopy includes a housing having an air impervious rear wall, air impervious side walls, and a perforated front wall forming a plenum in which a filter bag resides. The plenum is connected to a source of pressurized, preferably prefiltered, air so that pressurized air is supplied to the interior of the filter bag to diffuse through the filter bag into the plenum. Perforations in a predetermined area of the perforated front wall of the housing allow air to flow through the perforations and provide a substantially even flow of air from the perforated front wall of the diffuser into the canopy.

20 Claims, 3 Drawing Sheets

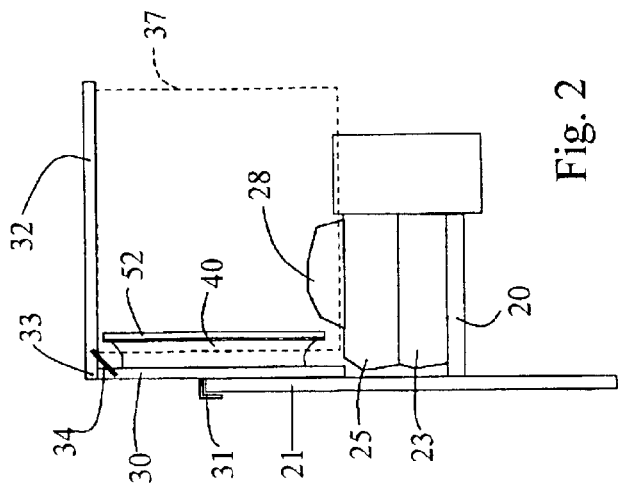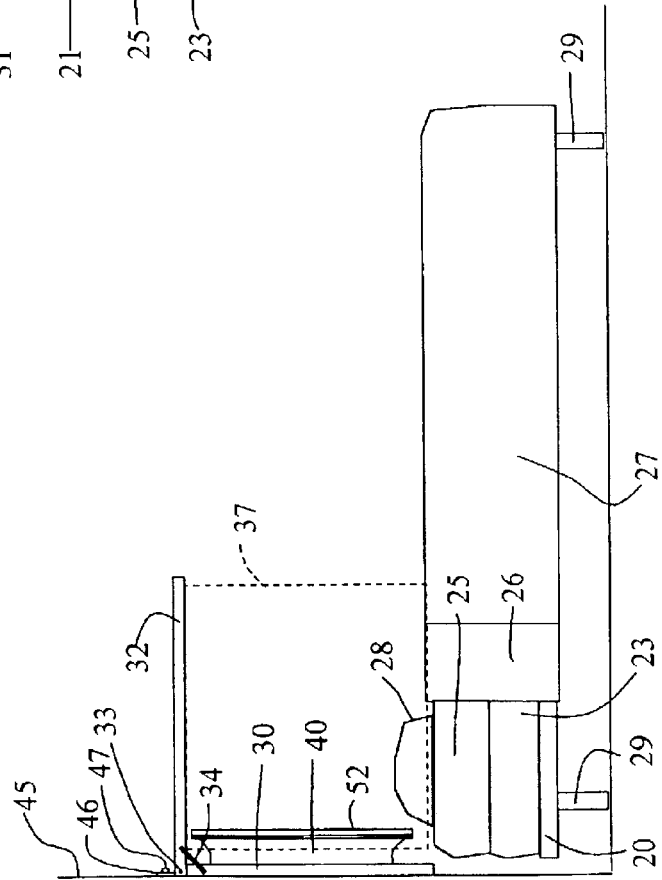

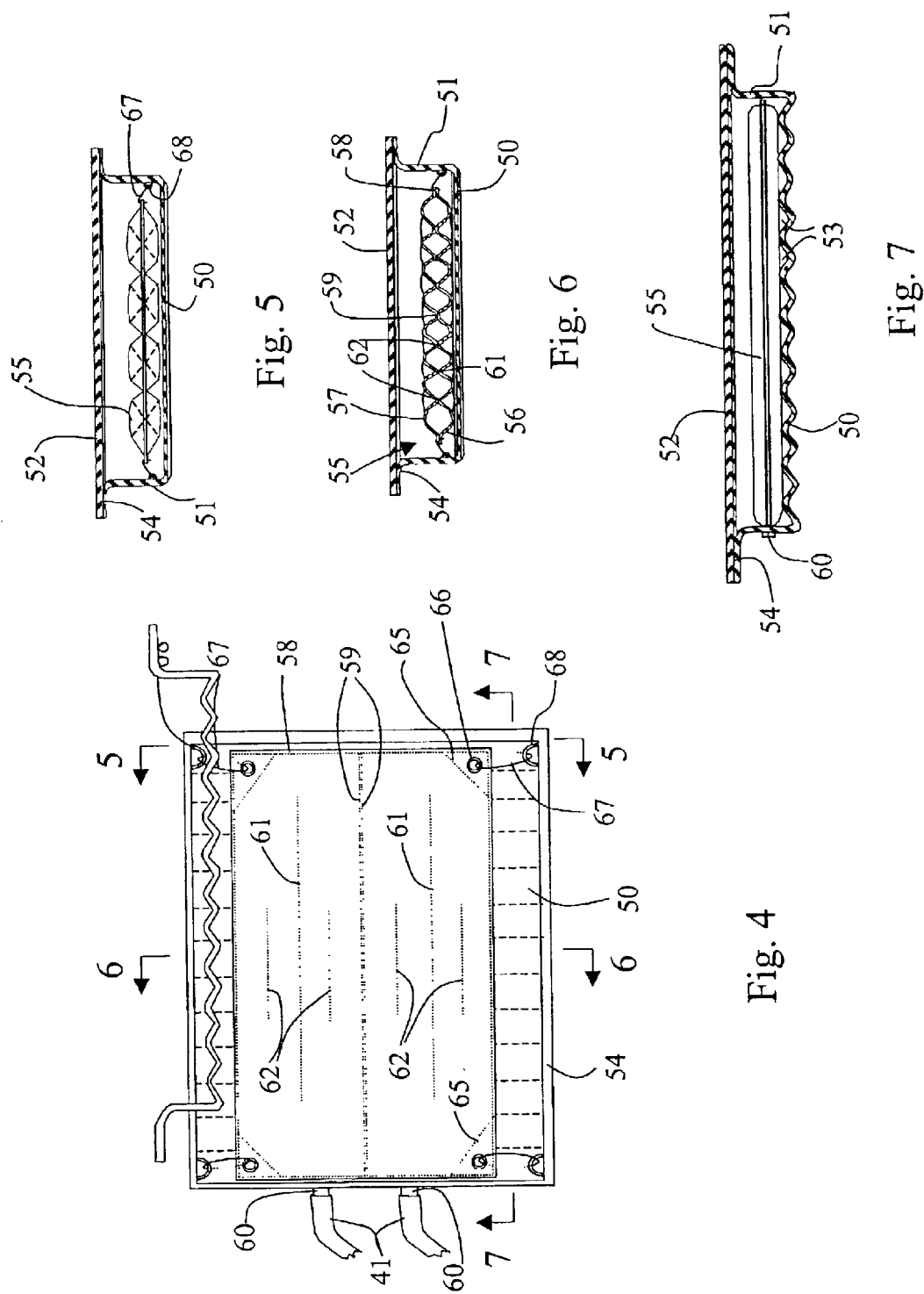

CANOPY AIR DELIVERY SYSTEM

RELATED APPLICATION

Figure 1:
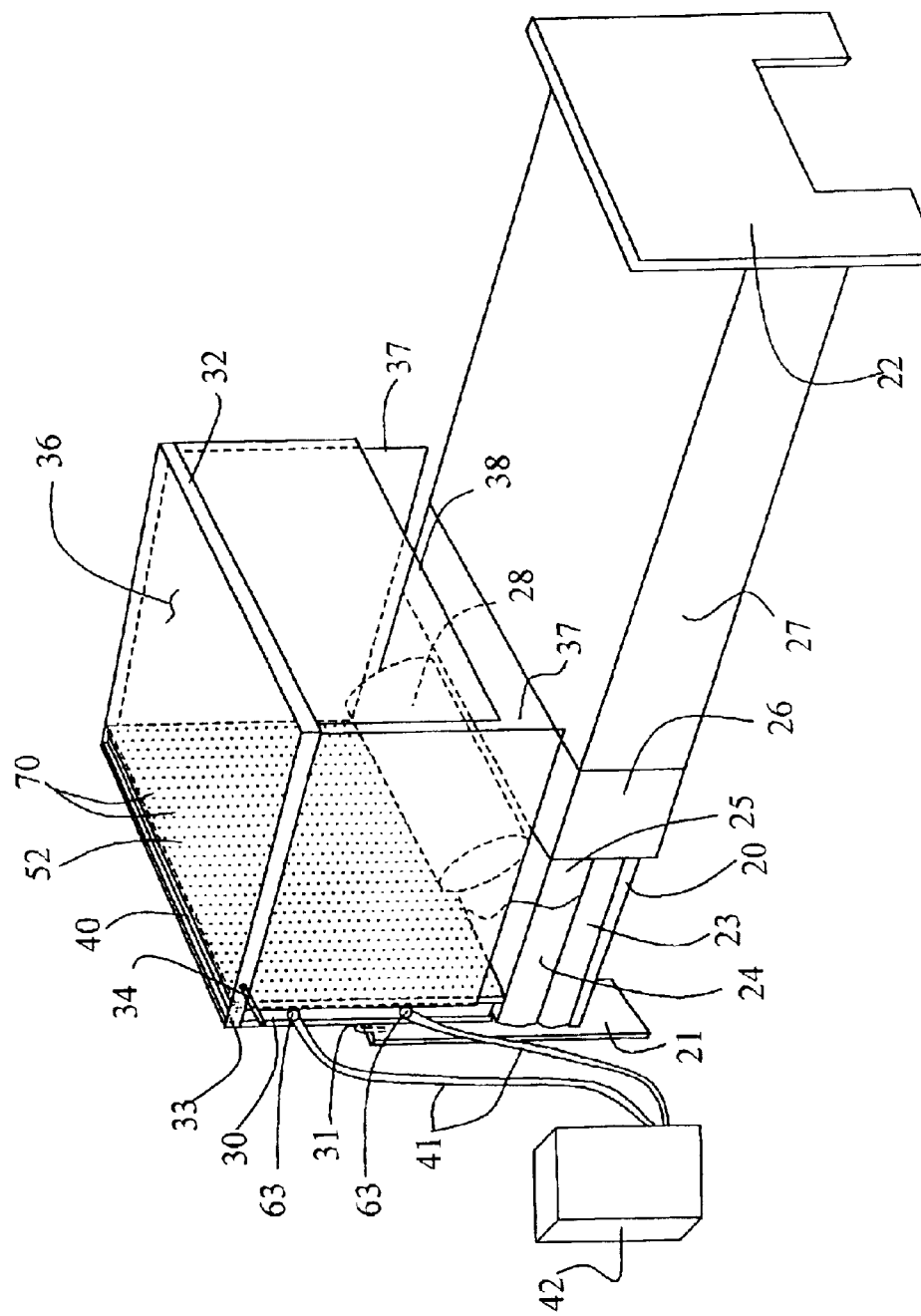

This application claims the benefit of provisional Application Ser. No. 60/304,377, filed Jul. 10, 2001, and entitled "Canopy Air Delivery System."

BACKGROUND OF THE INVENTION

1. Field

The invention is in the field of providing filtered air environments, particularly of providing filtered air to localized areas occupied by persons needing or desiring such environments.

2. State of the Art

There are various situation where an environment of filtered air is desirable. In some manufacturing processes, such as semiconductor manufacture, clean air is required. Such manufacturing usually takes place in clean rooms, entire rooms provided with special high capacity filtering systems that circulate clean air into and through the rooms. However, such rooms are expensive to build and operate so are used only when absolutely necessary. U.S. Pat. No. 5,195,922 discloses a modular system for providing clean room environments in small areas for particular manufacturing equipment. In some instances, the area will be large enough to be entered by a worker.

There are numerous situations where it would be desirable to provide environments with filtered air. In hospitals it is desirable to provide filtered air in operating rooms, in patient recovery areas, and in patient rooms in order to reduce the chance of infection for the patient. In the home and in the work place, filtered air can help people with allergies and asthma. However, the filtered air has to be supplied to the person needing such air or the site where such air is needed without contamination prior to reaching the person or site.

One approach to filtering air in a room is to provide an air filter in the room to circulate the room air through the filter. Room air is drawn into the filter, filtered, and discharged back into the room. Such a filter is shown in U.S. Pat. No. 5,453,049. It is difficult to make much difference in the room air in this way, however, because only a small portion of the air in the room is passed through the filter at any one time and the filtered air from the filter is immediately mixed with room air as it is discharged from the filter prior to reaching the person or localized site needing the filtered air.

U.S. Pat. No. 3,505,989 shows a portable clean room type, sealed enclosure which can be used for medical or other applications where a sterile environment is desired. However, a person is isolated in the enclosure and it is difficult to open and close the seals when entering and leaving the enclosure.

My prior U.S. Pat. No. 6,119,689 shows a canopy over a bed or other work or living area with filtered air supplied to the canopy to fill the canopy. In addition to the hospital uses, such canopy is particularly useful at home for people who suffer from allergies or otherwise desire to sleep in or other be in an atmosphere of filtered air. However, while the canopy is not a sealed space; so may be easily entered and left, and is made of a diaphanous material, many people desire a more open setting rather than being mostly or completely enclosed.

U.S. Pat. No. 3,820,536 shows a filter system which directs a flow of filtered air over a patient undergoing surgery and U.S. Pat. No. 3,724,172 shows a headboard assembly for a hospital bed which creates a flow of filtered air over the patient in a bed. Top and side walls extend a short distance from the headboard. The headboard is designed to provide a relatively high velocity flow of air around the perimeter of a breathing zone to create an air curtain to protect an inner breathing area of slower moving air from contamination.

U.S. Pat. No. 4,872,397 shows a work station having an individual source of air of controlled temperature so a worker can individually control the work station environment. Heated or cooled air from the building heating or air conditioning system is mixed with room air to control temperature. A filter is provided in the system to filter the air in each work station. However, the filtered air is mixed with room air in the work station so the station air is a mixture of filtered and unfiltered air.

SUMMARY OF THE INVENTION

According to the invention, an area air delivery system delivers filtered air to an area adjacent an air diffuser which area is occupiable by a person who can enter and leave the area and who desires an environment of filtered air. A canopy extends from the diffuser partially around the area, but the area is largely open for ease of access and to avoid a closed in feeling. While areas such as workstations or a home easy chair for reading or watching television may be arranged as such an area, the head end of a bed is a prime example of such an area where filtered air is supplied to a person while sleeping or reading or watching television while in bed. In such instance, the diffuser is located at the head of the bed to provide a gentle flow of air over the head of the bed. A canopy extends back from the head of the bed a short distance to surround the pillow area of the bed and then opens to the room to avoid a closed in feeling. The flow of air from the diffuser is sufficient to fill the canopy with filtered air and maintain enough flow through the canopy to prevent room air from entering the canopy. No high velocity air curtains are necessary. In situations where a room air vent, such as a heating or air conditioning vent, directs air to the opening of the canopy, a flap can be placed over a portion of the entrance to the canopy to keep such air out of the canopy.

The air diffuser comprises a housing having an air impervious rear wall, air impervious side walls, and a perforated front wall which directs air from the diffuser into the area adjacent the front wall. The housing forms a plenum for pressurized air to be directed through the perforations in the front wall of the housing. A filter bag connected to a source of pressurized air is positioned in the plenum to filter pressurized air supplied to the plenum and distribute the filtered pressurized air in the plenum. The filter bag is positioned in the housing so as to minimize or limit contact of the bag with the perforated front wall. This prevents the filter bag from blocking the perforations in the front wall and ensures a more even flow of filtered air through the front wall. The bag may be positioned in the housing by securing the corners of the bag to the housing or by various other means such as a screen located in the housing spaced from the perforated front wall. The rear wall of the housing is preferably channeled so that air can flow from the bag into such channels and flow along the rear wall and around the edges of the bag into the plenum adjacent the front wall to provide more air capacity to the diffuser and more even distribution of air in the plenum.

Preferably, the air supplied to the filter bag is prefiltered air such as filtered by various prefilters and a HEPA filter. The filter bag is then an ULPA filter for the final filtering of the air.

THE DRAWINGS

In the accompanying drawings, which show the best mode currently contemplated for carrying out the invention:

FIG. 1 is a pictorial view of a bed with the canopy air delivery system of the invention installed thereon;

FIG. 2, a side elevation of the bed with canopy of FIG. 1;

FIG. 3, a side elevation of a bed with the canopy air delivery system of the invention installed on a wall adjacent the bed to provide filtered air to the bed similarly to the embodiment of FIGS. 1 and 2;

FIG. 4, a side elevation of the diffuser housing with the front wall removed, showing the filter bag therein;

FIG. 5, a vertical section of the diffuser taken on the line 5—5 of FIG. 4;

FIG. 6, a vertical section of the diffuser taken on the line 6—6 of FIG. 4; and

FIG. 7, a horizontal section of the diffuser taken on the line 7—7 of FIG. 4.

DETAILED DESCRIPTION OF THE ILLUSTRATED EMBODIMENTS

FIGS. 1 and 2 show an embodiment of the area air delivery system of the invention as applied to a bed. The bed could be a hospital bed or could be a bed in a home or in a hotel. It also could be any size bed from a hospital size bed to a king size bed. As shown, the bed has a supporting frame 20 with a supporting headboard 21 and supporting footboard 22, which form supporting legs for the bed. This is a common bed configuration. Other bed configurations can be used, such as the other common configuration as shown in FIG. 3 where supporting legs 29 extend from the frame 20 with no headboard or footboard. A box spring 23 and mattress 24 rest on frame 20 and are shown with standard bedding sheets 25 and 26, blanket 27, and pillow 28.

In the embodiment shown in FIGS. 1 and 2 with a headboard, a canopy frame vertical portion 30 is attached to the headboard 21 such as with hooks 31 which fit over the top of the headboard. However, any type of attachment could be used. A canopy frame top portion 32 is hinged by pin 33 to vertical portion 30 and folds out from the vertical portion 30 to extend over the bed toward the foot of the bed. Lock 34 locks top portion 32 in extended position. As shown, the canopy frame top portion 32 is spaced above the bed. This leaves room between the top portion and the bed for a person to enter the bed, and preferably to sit up for reading or watching television.

A canopy top 36 is positioned over top frame portion 32. Top 36 may be of various materials such as a transparent or other plastic sheet material a diaphanous material, or a combination of materials, either porous or nonporous. Side curtains 37, which extend down from the canopy top portion 32, may be of similar or different material. Side curtains 37 will usually extend down to the top of the bed. Top 36 and side curtains 37 form a partial enclosure around the head end of the bed. This enclosure is open toward the foot end of the bed so does not completely close in a person in the bed. A more airy or open feeling can be created if a diaphanous and porous material, such as a polyester woven material with twenty five percent porosity, is used, at least for the side curtains. Porosity of such material may extend up to about thirty percent without having an adverse effect on the air holding and directing properties of the canopy. Further, since a porous diaphanous material transmits sound, a less isolated feeling is created. The canopy should extend from the head of the bed toward the foot of the bed at least to include the area of a user's head on the bed. In most cases, the canopy will not extend more than about three feet from the head of the bed.

If a room air duct, such as a heating or air conditioning duct, blows air directly toward the open end of the canopy, a front flap 38, of similar or different material as the side curtains, may be hung from the frame top portion 32 to partially block the entrance and deflect the room air from entering the canopy and mixing with the filtered air.

A diffuser 40 is secured to the vertical frame portion 30 in any suitable manner, such as by a bolt or hook, not shown, extending from the diffuser. The diffuser forms the head end of the canopy. The diffuser provides an even flow of air from the diffuser into the canopy, with the air distributed substantially evenly over the area of the diffuser in the canopy. The top and side curtains of the canopy should be positioned around the diffuser to prevent any substantial inflow of air from the room into the head end of the canopy. Then, the air from the diffuser will create a positive pressure in the canopy as it moves through the canopy to the open end which will keep room air from entering the canopy. The positive pressure will keep room air from coming in any other small openings in the canopy or between the canopy and the bed. If desired, a head end curtain or wall may be included to extend between and ensure closing of the head end of the canopy between the top and opposite side curtains, with the diffuser positioned inside the head end wall. The top, side curtains, and head end curtain could be fabricated to be a single piece with adjacent edges joined to prevent any openings where room air could enter.

The diffuser 40 is connected by hoses 41 to a source of pressurized air 42. In the presently preferred embodiments of the invention, the source of pressurized air 42 takes the form of an air filter unit. It includes a fan which draws room air into the filter unit 42, preferably through various prefilters such as an activated charcoal filter and large particle filter, and then forces the air through a HEPA filter as the air passes to hoses 41. This provides HEPA filtered air to the diffuser 40. The diffuser 40 preferably includes an ULPA filter through which the air passes prior to flowing from the diffuser into the canopy.

FIG. 3 shows a similar arrangement of canopy and bed as in FIG. 1 except that the bed does not have a headboard. The canopy frame 30 is attached to a wall 45 of a room such as by hanger 46 and screw 47. The head of the bed is placed adjacent the wall to position the canopy at the head of the bed. If a hospital or similar bed is used, the canopy frame 30 will preferably be secured to the bed frame supporting the mattress so will move with the head end of the mattress as it is raised and lowered.

A preferred embodiment of diffuser 40 is shown in FIGS. 4–7. A diffuser housing includes an air impervious rear wall 50, air impervious side walls 51, and a perforated front wall 52. A plenum is formed inside the housing. The rear wall 50 is corrugated to form channels 53 therein. The rear wall 50 and side walls 51 may be molded or otherwise formed as a single piece from a plastic material such as ABS plastic. In such case, a flange 54 is formed to extend around the forward perimeter or edge of side walls 51 for attachment of the perforated front wall 52, also molded or otherwise formed of a plastic material such as ABS plastic. A filter bag 55 is formed and sized to fit into the housing. The filter bag is formed of an ULPA filter material. The filter bag may be formed using two pieces of filter material 56 and 57, FIG. 6, with edges welded together as at 58, as by heating the material to melt it together. Center weld lines 59 divide the filter bag 55 into two compartments. Separate hose connectors 60 are separately secured to bag 55 for each of the compartments. Additional weld lines 61 and 62 are formed in each of the two compartments. The weld lines join the two sides of the filter bag to maintain a relatively flat configuration of the bag when the bag is inflated with pressurized air to be filtered. Without the weld lines, the bag would inflate like a balloon.

Various types of filter material may be used for the filter bag 55, with the joining of the opposite sides of the filter material in the lines 61 and 62 referred to as weld lines being done in a manner appropriate for the material used. A presently preferred filter material is the sandwiched filter material described in my U.S. Pat. No. 6,119,689, incorporated herein by reference. Such filter material includes a plurality of layers of submicron filter media, such as ULPA filter media, alternating with and sandwiching at least one layer of electrostatic filter media.

To assemble the diffuser, the filter bag 55 is positioned in the diffuser housing with hose connectors 60 extending through openings 63 in side walls 51. Preferably a seal is provided to seal the housing where connectors 60 pass therethrough. The hose connectors 60 may be configured of a material which fits in a sealing manner in openings 63 when positioned in such openings, or separate seals may be provided. With filter bag 55 positioned in the housing, front wall 52 is secured to the side walls, either permanently such as by gluing it to flange 54, or removably such as by bolts or other fasteners. Other means of securing front wall 52 to flange 54, or otherwise securing it to side walls 51, may be used. If permanently secured, the diffuser becomes a disposable item, which when the filter becomes full, is replaced. Filter bag 55 is positioned in the housing so as to limit the contact of the filter bag with front wall 52. This is necessary to prevent the filter bag from blocking the perforations in front wall 52. Filter bag 55 may include weld lines 65 at the corners of the bag to provide corner gussets with grommets 66 therein. Connectors, such as short bungie cords 67, may be used to connect the corners to brackets 68 secured, such as by gluing, to side walls 51 or rear wall 50. Various other means, such as a screen positioned in the housing between bag 55 and front wall 52 and spaced from front wall 52, may be used. Channels 53 in rear wall 50 extend substantially perpendicularly to the weld lines in bag 55 so that bag 55 does not expand completely into such channels as shown in FIG. 7. This allows air from the side of bag 55 against the rear wall 50 to enter channels 53 and flow around bag 55 to the area between bag 55 and front wall 52 to join with the air passing through the side of bag 55 toward front wall 52. This area in the plenum fills with pressurized air which flows out through the perforations in the perforated front wall. Air from both sides of the filter bag is generally needed to provide the necessary volume of air for proper and efficient operation of the system.

The perforations in the perforated front wall preferably take the form of circular holes 70 arranged in a regular grid pattern in wall 52, FIG. 1. Holes of one-quarter inch diameter on about one and one-quarter inch centers, have been found satisfactory. For a hospital bed or a single bed (a hospital bed generally is narrower, thirty six inches, than a single bed, forty two inches) a diffuser twenty seven inches high and thirty six inches wide has been found satisfactory. With such diffuser dimensions, a filter bag twenty four inches high and thirty two inches wide has been found to fit well into the housing and allow proper air flow. Also, with such dimensions, the quarter inch diameter perforations on one and one quarter inch centers provide 588 holes in the perforated front wall of the diffuser. For a queen size bed, fifty four inches wide, a diffuser twenty seven inches high and forty eight inches wide, with a filter bag twenty four inches high and forty four inches wide, has been found satisfactory. Such a diffuser has 782 holes in the perforated front wall. For a king size bed, seventy two inches wide, a diffuser twenty seven inches high and sixty six inches wide, with a filter bag twenty four inches high and sixty two inches wide, has been found satisfactory. Such a diffuser has 1078 holes in the perforated front wall. In each instance the top of the canopy is set at thirty six inches above the bed. This allows the bottom of the diffuser to be four and one half inches above the bed and the top of the canopy to be four and one half inches above the top of the diffuser.

With diffuser measurements as indicated above, it has been found satisfactory to make the diffuser housing such as to provide a plenum in the housing about three and three quarters inch deep and to make the channels in the rear wall about one half inch deep spaced about three inches apart. The filter bag is designed to have a maximum expansion to about three inches with up to about three and one half inches in the immediate area of the hose connector attachments. This leaves an open plenum area for air distribution along the front wall of at least about one half inch. The flange 54 can extend about one inch beyond the edge of the side walls 51 to provide for attachment of the front wall.

It has been found that an air flow through the diffuser holes of between about 200 to 240 feet per minute provides a mass air flow of about forty to fifty feet per minute at a distance of two feet from the diffuser wall. This has been found to provide sufficient air flow into and through the canopy to provide filtered air in the canopy and keep out room air under normal conditions, i.e., without room air being blown directly into the canopy. This flow rate has also been found to be comfortable for a person under the canopy in that it is discernable but not drafty and uncomfortable. This flow rate provides a normal sleep mode of operation to maintain the filtered air in the canopy. The system can be operated at a higher flow rate when first turned on to quickly (within two to three minutes) purge room air from the canopy. With the hospital and single bed size diffuser, a flow of about sixty CFM provides the sleep mode of operation. A flow rate of about one hundred fifty CFM provides the purge mode. With the queen size diffuser, a flow of about eighty CFM is necessary to maintain the sleep mode of operation. For the king size diffuser, a flow of one hundred ten CFM maintains the sleep mode conditions. The air flow is provided by the fan in the source of pressurized air and the speed of the fan may be made user adjustable to allow the user to adjust the volume of air discharged from the diffuser.

The number of holes specified and their arrangement and the volume of air supplied through the holes is designed to provide the required flow rates and provide satisfactory operation of the system. With the parameters specified, if the holes are made significantly larger, the thrust of the air passing through the holes is reduced so the mass of air in the canopy is not pushed forward to keep out room air. Similarly, if the holes are made significantly smaller, the air flow stalls a short distance from the diffuser and room air enters the diffuser. By significantly as used in this paragraph is meant that the system no longer operates as intended to fill the canopy with filtered air and keep room air out. With the above in mind, however, various changes may be made in the various operating parameters to maintain satisfactory operation of the system under different designs considerations.

It has been found that the use of the filter bag in the diffuser results in better distribution of air in the diffuser to provide more even flow of air over the entire perforated surface of the front wall and reduces the sound produced by the system. With the the source of pressurized air being an air filter unit as described with a prefilter and a HEPA filter, it is expected that the prefilters may have to be changed in the unit every month or so, the HEPA filter changed about every two years or so, and the ULPA filter in the diffuser changed about every five years. This makes it practical to provide the diffuser as a disposable unit.

While the invention has been described specifically as used with a bed, a similar system may be used in various other locations to provide areas of filtered air. Also, the diffuser may be used in various locations to provide filtered air.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. An air diffuser for diffusing pressurized air into a space adjacent one side of the diffuser, comprising:
    a housing having an air impervious rear wall, air impervious side walls, and a perforated front wall, the interior of the housing forming a plenum;
    a filter bag having opposite sides in the plenum, one of said opposite sides facing toward the perforated front wall of the housing and the other of the opposite sides facing toward the impervious rear wall of the housing;
    means connecting the filter bag to a source of pressurized air so that pressurized air is supplied to the interior of the filter bag to diffuse through the opposite sides of the filter bag into the plenum toward the perforated front wall of the housing and toward the impervious rear wall of the housing;
    means to limit contact of the filter bag against the perforated front wall of the housing; and
    perforations arranged in a predetermined area of the perforated front wall of the housing to allow air to flow through the perforations and provide a substantially even flow of air from the plenum, through the perforations, and away from the predetermined area of the perforated front wall.

2. An air diffuser according to claim 1, wherein the rear wall of the housing includes channels therein to allow air from the filter bag to flow through the channels to the sides of the housing and around the filter bag to the perforated front wall.

3. An air diffuser according to claim 2, wherein the filter bag is constructed to limit to a preset amount the inflation of the filter bag when pressurized air is supplied to the interior of the bag.

4. An air diffuser according to claim 3, wherein opposite sides of the filter bag are connected to limit the inflation of the bag.

5. An area air delivery system for delivery of filtered air to an area occupiable by a user who can enter and leave the area, comprising:
    a canopy for at least partially surrounding the area to which air is to be supplied and defining the area which a user can enter and leave; and
    an air diffuser in the canopy, said air diffuser including:
        a housing having an air impervious rear wall, air impervious side walls, and a perforated front wall, the interior of the housing forming a plenum;
        a filter bag having opposite sides in the plenum, one of said opposite sides facing toward the perforated front wall of the housing and the other of the opposite sides facing toward the impervious rear wall of the housing;
        means connecting the filter bag to a source of pressurized air so that pressurized air is supplied to the interior of the filter bag to diffuse through opposite sides of the filter bag into the plenum toward the perforated front wall of the housing and toward the impervious rear wall of the housing;
        means to limit contact of the filter bag against the perforated front wall of the housing; and
        perforations arranged in a predetermined area of the perforated front wall of the housing to allow air to flow through the perforations and provide a substantially even flow of air from the plenum, through the perforations, and away from the predetermined area of the perforated front wall into the canopy.

6. An air delivery system according to claim 5, wherein the air delivery system is used in conjunction with a bed having a head, and the canopy includes a top portion spaced above the bed extending rearwardly from the head, side portions extending rearwardly from the head and between the top portion and the bed, and the air diffuser is positioned at the head to direct air into the canopy.

7. An air delivery system according to claim 6, wherein the top portion and the side portions extend about three feet from the head.

8. An air delivery system according to claim 7, wherein the side portion is formed of porous material.

9. An air delivery system according to claim 5, wherein the air diffuser supplies air through the perforations at a speed of between about 200 feet per minute and 240 feet per minute, and the canopy confines the air from the diffuser to the extent that the air is traveling as a mass in the canopy at between about 40 feet per minute and 50 feet per minute at a distance of about two feet downstream from the diffuser.

10. An area air delivery system for delivery of filtered air to an area occupiable by a user who can enter and leave the area, comprising:
    a canopy for at least partially surrounding the area to which air is to be supplied and defining the area which a user can enter and leave; and
    an air diffuser in the canopy, said air diffuser including:
    a housing having an air impervious rear wall, air impervious side walls, and a perforated front wall, the interior of the housing forming a plenum;
    means connecting the plenum to a source of pressurized air so that pressurized air is supplied to the interior of the plenum; and
    perforations arranged in a predetermined area of the perforated front wall of the housing to allow air to flow through the perforations at a speed of between about 200 feet per minute and 240 feet per minute to provide a substantially even flow of air from the predetermined area of the perforated front wall into the canopy; and
    the canopy being configured to confine the air from the diffuser to the extent that the air is traveling as a mass in the canopy at between about 40 feet per minute and 50 feet per minute at a distance of about two feet downstream from the diffuser.

11. An air diffuser for diffusing pressurized air into a space adjacent one side of the diffuser, comprising:
    a housing having an air impervious rear wall, air impervious side walls, and a perforated front wall, the interior of the housing forming a plenum;

a filter bag in the plenum;

means connecting the filter bag to a source of pressurized air so that pressurized air is supplied to the interior of the filter bag to diffuse through the filter bag into the plenum;

means to limit contact of the filter bag against the perforated front wall of the housing;

channels in the rear wall of the housing to allow air from the filter bag to flow through the channels to the sides of the housing and around the filter bag to the perforated front wall; and perforations arranged in a predetermined area of the perforated front wall of the housing to allow air to flow through the perforations and provide a substantially even flow of air from the plenum, through the perforations, and away from the predetermined area of the perforated front wall.

12. An air diffuser for diffusing pressurized air into a space adjacent one side of the diffuser, comprising:

a housing having an air impervious rear wall, air impervious side walls, and a perforated front wall, the interior of the housing forming a plenum;

a filter bag in the plenum;

means connecting the filter bag to a source of pressurized air so that pressurized air is supplied to the interior of the filter bag to diffuse through the filter bag into the plenum, said filter bag constructed to limit to a preset amount the inflation of the filter bag when pressurized air is supplied to the interior of the bag;

means to limit contact of the filter bag against the perforated front wall of the housing;

channels in the rear wall of the housing to allow air from the filter bag to flow through the channels to the sides of the housing and around the filter bag to the perforated front wall; and perforations arranged in a predetermined area of the perforated front wall of the housing to allow air to flow through the perforations and provide a substantially even flow of air from the plenum, through the perforations, and away from the predetermined area of the perforated front wall.

13. An air diffuser according to claim 12, wherein opposite sides of the filter bag are connected to limit the inflation of the bag.

14. An air diffuser according to claim 13, wherein the filter bag is made of ULPA filter material.

15. An air diffuser according to claim 14, wherein the filter bag is divided into two sides, each side being separately connected to the source of pressurized air.

16. An air diffuser according to claim 12, wherein the means to limit contact of the filter bag against the perforated front wall is securement means for the at least one filter bag to secure the filter bag in position in the housing away from the perforated front wall.

17. An air diffuser according to claim 16, wherein the means to limit contact of the filter bag against the perforated front wall is securement means for the at least one filter bag to secure the filter bag in position in the housing away from the perforated front wall.

18. An air diffuser according to claim 17, wherein the filter bag includes corner attachment means and additionally includes means for attaching the corners of the bag to the housing to maintain the position of the bag in the housing away from the perforated front wall.

19. An air diffuser according to claim 18, wherein means for attaching are bungie cords extending from the corners of the filter bag to the housing.

20. An air diffuser according to claim 17, wherein the perforations in the perforated front wall are holes arranged in an evenly spaced grid.

* * * * *